Jan. 2, 1962
R. E. HUNT
APPARATUS FOR DISPENSING LIQUIDS
3,015,421

Filed May 26, 1959 — 3 Sheets-Sheet 1

*INVENTOR.*
ROBERT E. HUNT
BY
*Elmer J. Nealon*
ATTORNEY.

Jan. 2, 1962 R. E. HUNT 3,015,421
APPARATUS FOR DISPENSING LIQUIDS
Filed May 26, 1959 3 Sheets-Sheet 2

INVENTOR.
ROBERT E. HUNT
BY
Elmer J. Nealon
ATTORNEY.

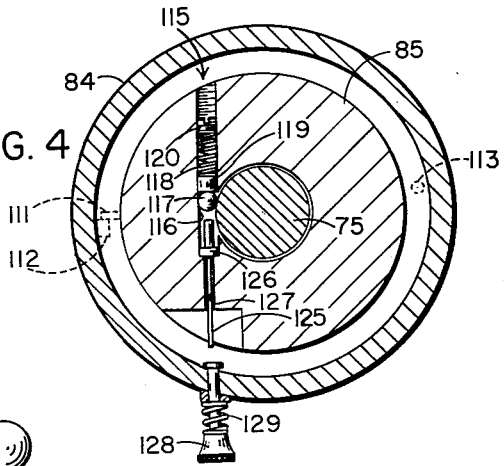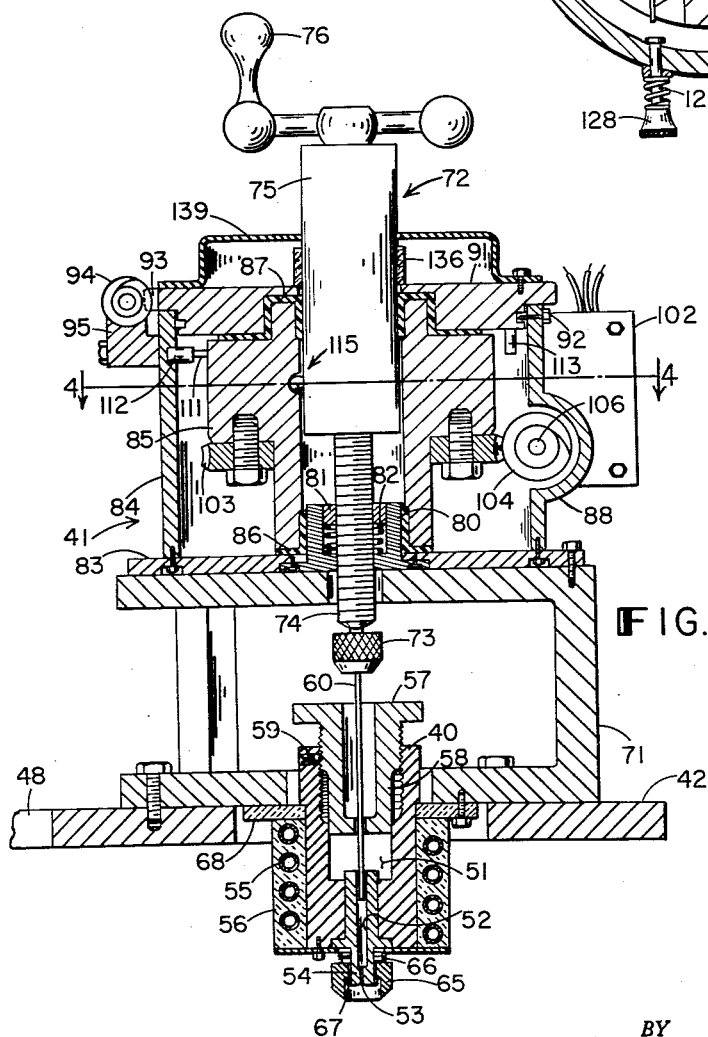

United States Patent Office 3,015,421
Patented Jan. 2, 1962

3,015,421
APPARATUS FOR DISPENSING LIQUIDS
Robert E. Hunt, Reading, Mass., assignor to Sylvania Electric Products Inc., a corporation of Delaware
Filed May 26, 1959, Ser. No. 815,978
5 Claims. (Cl. 222—309)

This invention relates to apparatus for dispensing uniform individual quantities of liquid material from a reservoir of the material. It is particularly concerned with apparatus in which the liquid is dispensed in increments determined by the degree of movement of the end of a lead screw and in which means is provided for extremely accurate control of the incremental rotation and axial movement of the screw.

The extremely small size of many electrical components frequently requires that apparatus employed in their manufacture be capable of extremely minute, yet precise, reproducible actions. For example, in the fabrication of alloyed junction semiconductor devices according to the teachings in patent application S.N. 705,397, filed December 26, 1957, by Robert C. Ingraham and assigned to the assignee of the present invention, minute quantities of molten electrode material are extruded from containers and forced into contact with the surface of dies of semiconductor material. In order that each globule of molten material from a container be of the same volume the apparatus for extruding the globules from a container must be carefully controlled. The globules of electrode material are dispensed and their volume is determined by displacement of the molten material by a piston of uniform cross sectional area which is progressively inserted into the container in small discrete steps. The amount of linear movement of the piston to displace each globule is generally extremely small, and may be of the order of less than one-thousandth of an inch. As shown in the aforementioned Ingraham application, the appropriate linear movement of a piston may be obtained by rotation of a lead screw through a precise, predetermined angle so as to advance the end of the lead screw a precise, predetermined linear distance into the container. For each rotation of the lead screw through the same predetermined angle a globule of molten electrode material of predetermined volume is dispensed from the container.

It is an object of the invention, therefore, to provide an improved apparatus for producing movement of an element in a series of precise increments each of which is equal to the others.

It is a more particular object of the invention to provide an improved apparatus for dispensing liquid material in precise, equal quantities.

It is an additional object of the invention to provide an improved apparatus for continually rotatably indexing a lead screw in a series of discrete steps each of the same predetermined angle thereby to obtain advancement of the end of the lead screw in a series of precise, equal, linear movements.

Briefly, in accordance with the objects of the invention a vessel is provided for containing liquid material. The vessel has one aperture for the liquid to pass through and a second aperture into which a displacement piston fits snugly. Movement of the piston into the vessel causes molten material to be extruded from the vessel through the one aperture. A lead screw is attached to the end of the piston and its threads are engaged by a threaded nut which is fixed in position with respect to the vessel. The lead screw is encircled by an annular driving member. A hitch maintains the relative alignment of the annular member and the lead screw as the annular member is rotated in one direction, and permits the annular member to move independently of the lead screw as the annular member is rotated in the opposite direction. Driving means are provided for rotating the annular member in each direction, and stops limit the amount of rotation of the annular member in each direction.

It is a feature of the invention to provide a rotatable bearing support for positioning the lead screw and annular member within a housing. An adjustable stop for regulating the angle of rotation of the annular member and lead screw is fixed to this bearing support. The angle of rotation of the lead screw is thus determined by the orientation of the bearing support with respect to the housing.

It is also a feature of the invention to utilize the rotation of a lead screw to obtain both rotational motion and linear motion of the displacement piston as it is advanced into the vessel in order to minimize hysteresis effects caused by static friction between the piston, vessel, and liquid material.

Apparatus according to the invention together with its manner of operation and additional objects, features, and advantages may best be understood from the following detailed discussion and the accompanying drawings wherein:

FIG. 3 is an elevational view in cross section of the dispensing apparatus shown in FIG. 2; and FIG. 4 is a cross sectional view of portions of the apparatus taken through line 4—4 of FIG. 3 for showing the hitch mechanism in detail.

Figure 1:
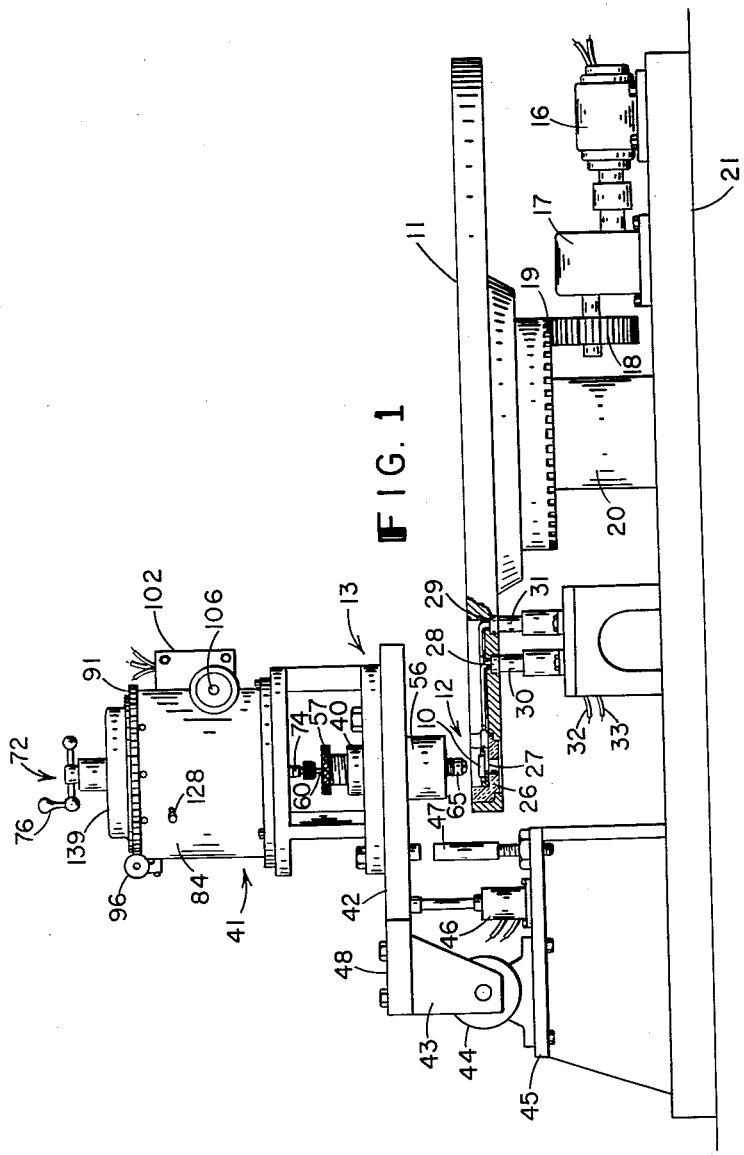
FIG. 1 is a view of apparatus according to the invention utilized in apparatus for the fabrication of alloyed junction semiconductor devices according to the teachings in the aforementioned Ingraham application.

In order to present the details of the invention in such a manner as to provide an understanding of its full significance and possibilities, it will be described in conjunction with apparatus for producing alloyed junction semiconductor devices according to the teachings of the aforementioned Ingraham application. One form of apparatus, as shown in FIG. 1, includes a revolving turret 11 having a plurality of work positions 12 evenly spaced around its perimeter. The turret indexes periodically to place each work position in succession at the station occupied by the dispensing apparatus 13. This apparatus applies a quantity of junction forming electrode material in the form of a molten globule to the surface of a semiconductor die 10 which has been placed in the work position at a previous station. The turret is driven by an electric motor 16 through an indexing mechanism 17 via suitable gears 18 and 19. The turret rotates about a supporting center post 20 which is secured to a base platform 21.

Each of the work positions 12 has a ceramic insert 26 in the upper surface of the turret and a resistance heating element 27 located on the ceramic insert. The heating element is of suitable configuration so that the semiconductor die is properly positioned thereon. It is connected by means of two leads to turret contacts 28 and 29 set in the lower surface of the turret. External mating contacts 30 and 31 are biased against the set of turret contacts when the work position is in position beneath the dispensing apparatus. Leads 32 and 33 connect the external contacts to a suitable source of electrical power (not shown).

Dispensing apparatus 13 for applying the electrode material to the semiconductor die in globule form includes a crucible or vessel 40 for containing the molten electrode material and driving apparatus 41 for causing a precise volume of the molten electrode material to be extruded from the vessel. The dispensing apparatus is mounted on a support plate 42 which is pivotally mounted on a pivot block 44 by means of brackets 43 attached to each arm 48 of the plate. The pivot block is secured to a platform 45 which is firmly attached to the base platform 21. A solenoid 46 raises and lowers the dispensing apparatus, and an adjustable stop 47 determines the exact location of the apparatus relative to the semiconductor die in the lowered position. The configuration of the plate, brackets, and pivot block is such that the dispensing apparatus can be pivoted manually approximately 180° for purposes to be explained hereinafter.

Figure 2:
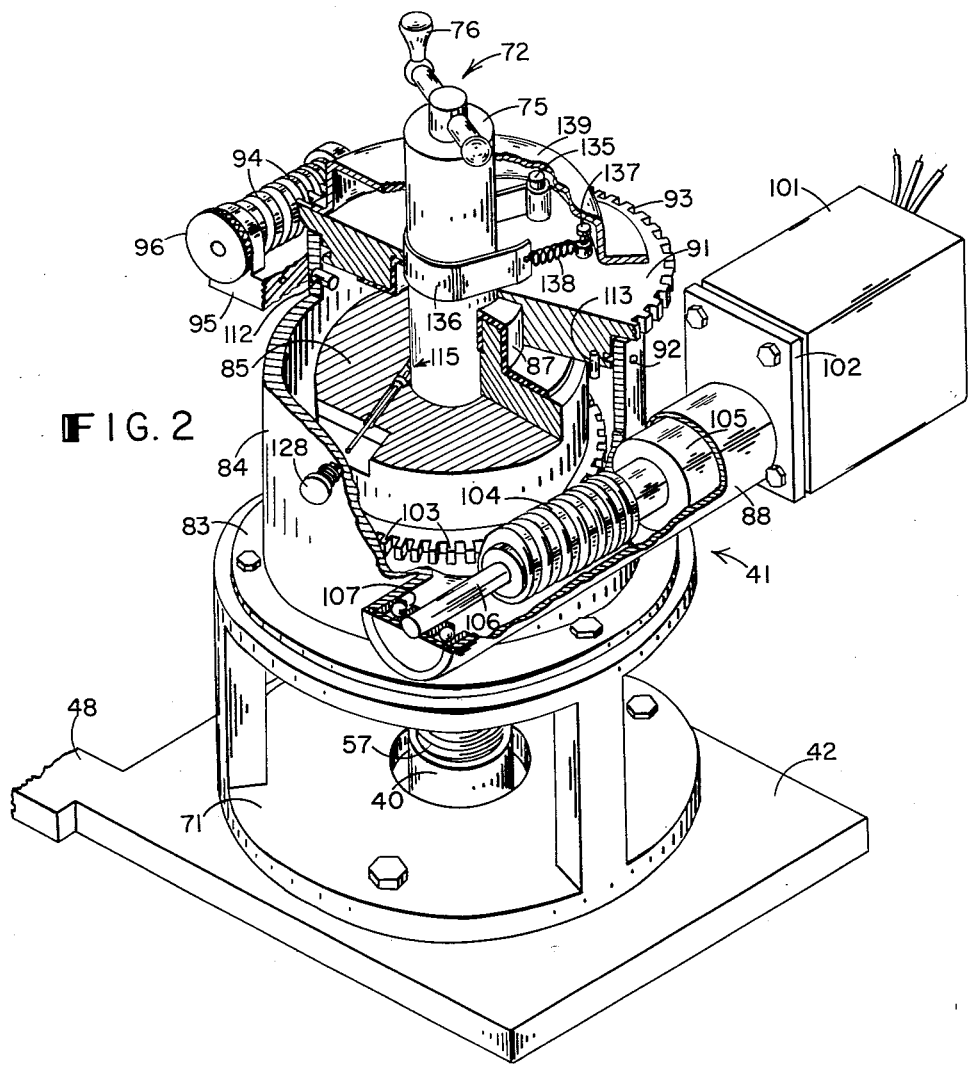
FIG. 2 is a perspective view of the dispensing apparatus of FIG. 1 with sections cut away to display various portions of the apparatus.

Details of the dispensing apparatus 13 including the container or vessel 40 for the molten electrode material and the driving apparatus 41 for extruding the material from the container are shown in the perspective view of FIG. 2 and in the cross-sectional view of FIG. 3. The container assembly for the molten electrode material may best be seen in FIG. 3. The container assembly includes the vessel 40 having a first chamber 51 of relatively large cross-sectional area, a second chamber 52 of smaller cross-sectional area, and a narrow duct 53 which extends from the smaller chamber through a nozzle portion 54 to an aperture in the lower face of the nozzle. The walls of the vessel in the region of the two chambers are surrounded by a heating coil 55 embedded in an insulating jacket 56. The coil is resistance heated by electric current from a power supply (not shown). A bushing 57 having a threaded portion mating with internal threads on the upper portion of the wall surfaces of the larger chamber has a portion 58 which fits snugly within the unthreaded portion of the chamber. The volume within the larger chamber can thus be varied by screwing the bushing in or out. The bushing is locked in any desired position by a set screw 59. The internal diameter of the bushing is of substantially the same diameter as the diameter of the smaller chamber 52. A rod or piston 60 fits nugly within the bushing and within the smaller chamber, thus serving as a closure for the smaller chamber and sealing it off from the larger chamber. Movement of the piston serves to vary the volume within the smaller chamber. Liquid material within the smaller chamber is extruded through the nozzle in an amount equal to the volume of the portion of the piston inserted into the chamber by a linear movement of the piston. The container assembly also includes a ring shaped member 65 which serves as a hold-down device for the semiconductor die. This member is biased downward, away from the container, by means of a compression spring 66. A retaining ring 67 at the lower end of the nozzle serves as a stop to limit downward motion of the hold-down member with respect to the container.

The container assembly is attached by means of a thermally insulating plate 68 to the lower frame 71 of the drive apparatus for manipulating the displacement piston 60. The lower frame is attached to the plate 42 which supports the dispensing apparatus. A lead screw member 72 is removably attached to the displacement piston 60 by means of a chuck 73. The lead screw member includes a threaded portion 74, a cylinder portion 75 and a handle 76. The lead screw passes through an opening in the upper portion of the lower frame 71 and the threaded portion is engaged by a lead screw advancing nut assembly which includes an advancing nut 80 and a back-lash eliminating nut 81 biased away from the advancing nut by a compression spring 82. The lead screw advancing nut assembly is attached to the base plate 83 of the piston drive apparatus which in turn is rigidly mounted to the lower frame 71. A housing or supporting structure 84 for the drive apparatus is secured to the base plate 83. An annular drive drum 85 is located within the housing coaxial with and encircling the lead screw member. The lower portion of the drum rides on a first nylon bushing 86. The upper portion rides in a second nylon bushing 87 which is held in position by a bearing support 91 which serves as a cover for the housing. Retaining screws 92 in the housing extend into a slot around the periphery of the bearing support. The support is thus assembled to the housing but may be rotatably oriented with respect thereto, the purpose for which will be explained hereinbelow. The bearing support or cover has machined along its entire periphery a plurality of gear teeth 93 which mesh with a worm 94 attached to the housing 84 by means of a bracket 95. Rotation of a knob 96 which is directly connected to the worm thus rotates the cover about the axis of the drum and the lead screw member.

The annular drive drum 85 is rotated by a reversible electric motor and drive assembly 101 which is bolted to a supporting plate 102 fixed to the generally tagentially extending portion 88 of the housing 84. A gear 103 fastened to the underside of the upper portion of the drum meshes with a worm 104. The motor shaft is coupled to the worm gear through a suitable slip clutch 105, the details of which are not shown in the drawings. The motor is thereby effectively disengaged from the drum whenever rotation of the drum is prevented. The worm shaft 106 is supported in a bearing 107 mounted in the portion of the housing enclosing the drum drive mechanism.

A drum stop 111 rigidly secured to the drive drum 85 limits the amount of rotation of the drum in the counterclockwise direction by contact with a fixed stop 112 mounted in the housing. An adjustable stop 113 in the cover 91 limits the amount of rotation of the drum in the clockwise direction by contact with the drum stop 111. The function of the stops may best be appreciated from FIG. 4 wherein the positions of the stops are shown in phantom. The position of the cover stop 113 is adjustable through rotation of the cover 91 by means of the cover adjusting mechanism discused hereinabove. The cover stop may be precisely positioned with respect to stop 112 so as to permit any angle of drum rotation from 0° up to almost 360°. Appropriate scale markings on the cover and housing and on the adjusting knob 96 may be employed to permit accurate setting of the angle.

The drum 85 has mounted therein a ball hitch mechanism or unidirectional clutch 115 for causing the lead screw member 72 to be rotated with the drum in the clockwise direction viewed from above in the drawings, and for permitting the drum to be rotated independently of the lead screw member in the counterclockwise direction. The hitch mechanism, as best shown in FIG. 4, is positioned in a bore 116 in the drive drum. A ball or sphere 117 of appropriate size is located in the bore so as to jam between the cylinder portion 75 of the lead screw and the opposing wall of the bore as the drum is rotated in the clockwise direction. That is, the cylinder extends into the bore far enough to prevent passage of the sphere therethrough. The axis of the bore is at an angle of approximately 11° from the tangent to the cylinder at the point the cylinder and sphere are in contact. The sphere normally is held in position against the cylinder and bore wall by a compression spring 118 acting through a plug 119. The spring in turn is held in position by a retaining screw 120. As can be seen from FIG. 4, as the drive drum is rotated in the clockwise direction the sphere is jammed between the cylinder and the wall of the bore, thus effectively locking the cylinder and drum together and causing the lead screw to be rotated with the drum. As the drum is rotated in the counterclockwise direction, the sphere is released from its jammed position between the wall of the bore and the cylinder against the action of the spring 118, thus permitting the drum to rotate independently of the cylinder. The clockwise direction may thus be considered the drive direction, and the counterclockwise direction the slip direction.

A hitch release rod 125 having a retaining collar 126 thereon is located in the bore 116 of the drum and in a bore 127 of smaller cross section. A plunger 128 mounted in the housing 84 and biased outwardly by a compression spring 129 may be pressed inwardly to advance the release rod and move the sphere out of contact with the cylinder and wall of the bore. Thus, with the drum in the position with the drum stop against the fixed stop, the plunger 128 may be depressed permitting the lead screw member to be rotated freely in either direction by means of the handle 76.

A band brake mounted on the top of the cover 91 cooperates with the ball hitch mechanism 115 to prevent rotation of the lead screw member when the drum is rotated in the slip direction. The brake mechanism includes a stud 135 to which one end of a leather strap 136 is firmly attached and a second stud 137 to which the other end of the strap is connected through a tension spring 138. When the drum is rotated in the drive direction, the strap slips on the cylinder because it is attached with a spring. When the drum is rotated in the slip direction, however, the leather grips the cylinder sufficiently to overcome any friction existing between the cylinder and the drum, and thus prevents the lead screw from being rotated with the drum. A hood 139 encloses and protects the band brake mechanism.

The apparatus shown and described herein operates in the following manner when employed in the fabrication of alloyed junction semiconductor devices according to the teachings of the aforementioned Ingraham application. The container 40 is filled with molten electrode forming material, and the bushing 57 and piston 60 are adjusted so that all gases are expelled from the container and only molten material is extruded therefrom. Next, the end of the displacement piston 60 is positioned in the top of the smaller chamber 52 sealing it off from the larger chamber 51. The cover 91 of the dispensing apparatus is oriented with respect to the housing by means of the knob 96 to set the adjustable stop 113 in the desired position. A semiconductor die 10 is placed in a work position 12 and the turret 11 is rotated to place that work position under the electrode material dispensing apparatus 13. The solenoid 46 is deactivated permitting the apparatus to pivot on the pivot block 44 and move downward until the support plate 42 rests on the stop 47. As the dispensing apparatus moves downward the hold-down member 65 contacts the semiconductor die, and the spring 66 is compressed as the apparatus moves slightly farther and stops with the lower face of the nozzle precisely and accurately located at a distance above the surface of the semiconductor die which has been predetermined by the adjustment of stop 47.

When the dispensing apparatus is in position, the elements of the displacement piston drive apparatus are in the positions shown in the drawings with the drum stop 111 abutting the fixed stop 112. The motor and drive assembly 101 is energized to rotate the drive drum in the clockwise, or drive, direction. The action of the ball hitch mechanism 115 as explained hereinabove maintains the relative radial alignment of the cylinder and drum and thus the cylinder is rotated with the drum. When the drum has been rotated through the angle established by the position of the cover and the drum stop 111 contacts the adjustable stop 113, the drum and lead screw stop rotating. The slip clutch mechanism 105 permits the drum and cylinder to be stopped while the motor continues to operate. The amount of rotation of the drum and cylinder is thus independent of the motor. As the cylinder is rotated, the rotation of the threaded portion 74 of the lead screw in the lead screw advancing nut 80 causes downward axial movement of the lead screw in addition to the rotational movement. The attached displacement piston thus moves downward a precise linear distance determined by the pitch of the screw threads and the angle of rotation of the cylinder. The volume of piston advanced into the smaller chamber 52 causes the same volume of molten electrode material to be extruded through the duct 53 in the nozzle and into contact with the surface of the semiconductor die 10.

Rotational motion of the piston serves to eliminate possible hysteresis effect reulting from the momentary deformations of the piston, the vessel, and the molten electrode material which may be caused by the static friction existing between them if the piston undergoes linear motion only. The combination of rotational and linear motion assures extrusion of precise, equal volumes of molten material for each linear movement of the piston.

After the globule of electrode material has been extruded into contact with the semiconductor die, a suitable heating cycle is performed by current flow through the leads 32 and 33 to the heating element 27 in order to join the globule and die as taught in the aforementioned Ingraham application. Either before, after, or during the heating cycle, depending on the desired nature of the junction of the globule to the die, the solenoid 46 is activated to raise the dispensing apparatus. As this action occurs, the hold-down member 65 holds the semiconductor die in position on the heater element until after the nozzle 54 has moved sufficiently to break the contact between the globule which is adherent to the semiconductor die and the contents of the container.

After the globule has been extruded from the container, the motor 101 is energized to rotate the drive drum 85 in the slip, or counterclockwise, direction. As the drum is rotated, the ball 117 in the hitch mechanism slips from its jammed position between the cylinder and wall of bore and permits the drum to be rotated independently of the cylinder. The band brake assists in obtaining the desired action by holding the cylinder stationary against any slight frictional force tending to cause rotation in the slip direction. When the drum stop 111 contacts the fixed stop 112 on the housing, the slip clutch permits the motor to overrun without damage. The drum is thus returned to its original position relative to the apparatus while the lead screw remains in its advanced position.

Thus, for each complete cycle of operation of the drive drum, the cylinder is rotated through a predetermined angle advancing the end of the lead screw a precise linear amount. Each repetition of the cycle causes the cylinder to be rotated through the same angle and the piston 60 to be advanced the same amount, thereby extruding another globule of the same volume from the container 40. Each semiconductor die with a solidified globule or pellet of electrode material adhering thereto may be further processed in accordance with known techniques to provide an alloyed junction semiconductor device.

Upon depletion of the electrode forming material within the smaller chamber 52, the dispensing apparatus is pivoted in the vertical plane nearly 180° on the pivot block 44 in order to position the dispensing apparatus with the nozzle uppermost and the handle down. With the drive drum in its normal position relative to the housing, as shown, the hitch release plunger 128 is depressed thus inactivating the hitch mechanism 115. The piston 60 is then completely retracted from the smaller chamber by rotation of the lead screw handle 76. Manual rotation of the lead screw readily overcomes the amount of friction applied by the band brake. The bushing 57 is then advanced until molten electrode material is extruded from the nozzle and the piston is advanced by rotation of the lead screw handle until the end of the piston is within the small chamber. The apparatus is then pivoted to its normal upright position as shown in FIG. 1. Since none of the stop or other settings have been changed during this recharging procedure, the apparatus is immediately in readiness for continuing the dispensing of globules of exactly the same dimensions.

In a typical application of the apparatus to the method described and claimed in the Ingraham application, globules having volumes equal to spheres of .025 and .031 inch in diameter, respectively, are dispensed against opposite sides of germanium dies in the process of fabricating alloyed junction transistors. For each size of globule the container employed utilizes a displacement piston 60 of 1/16 inch diameter. The threaded portion of the lead screw has a thread pitch of forty threads per inch. The drive drum gear 103 has a total of sixty teeth and is driven by a motor and drive assembly 101 having a shaft speed of fifty-six revolutions per minute. This combination provides a drum speed on the order of one revolution per minute, thus preventing violent acceleration and deceleration with consequent disruption of precise adjustments. In order to produce globules equivalent to spheres having diameters of .025 and 0.31 inch, the linear movement of a 1/16 inch diameter displacement piston is .00267 and .00508 inch, respectively. Thus, with a lead screw pitch of forty threads per inch, rotation of the lead screw through angles of 38.4° and 73.2° respectively, is required.

Dispensing apparatus of the type shown and described has been utilized to obtain exceptionally small globules of electrode material by employing a container having a smaller chamber, a smaller displacement piston, and a finer lead screw. For example, a container having a small chamber of .040 inch in diameter is employed in combination with a displacement piston of approximately the same diameter which fits snugly within the chamber. The lead screw member and lead screw advancing nut have a pitch of forty-eight threads per inch. With this apparatus globules equivalent to spheres of .010 inch in diameter have been obtained consistently within 5% variation in volume. The linear movement of the displacement piston for a globule of this size is .000417 inch and the angular movement of the lead screw is 7.20°.

What is claimed is:

1. Apparatus for repeatedly dispensing liquid material in precise quantities including a vessel for containing liquid material, said vessel having a first aperture therein for the passage of liquid material therethrough and a second aperture therein, a piston adapted to fit snugly within said second aperture, one end of said piston extending into said vessel whereby movement of the piston further into the vessel when the vessel is filled with liquid material and all gases have been expelled therefrom causes a quantity of liquid material to be displaced and extruded through said first aperture, the opposite end of said piston being attached to a lead screw having a threaded portion, a support fixedly positioned with respect to said vessel, a threaded lead screw advancing nut rigidly mounted with respect to said support for engaging the threaded portion of the lead screw, a driving drum encircling said lead screw, a unidirectional clutch in said drum for binding the lead screw to the drum as the drum is rotated in one direction and for disengaging the lead screw from the drum as the drum is rotated in the opposite direction, a first stop means associated with said drum and said support for establishing a first position of said drum with respect to said support, a second stop means associated with said drum and said support for establishing a second position of said drum with respect to said support at a predetermined angle of rotation of said drum from said first position, and driving means for rotating said drum from said first position to said second position in the one direction and for rotating said drum from said second position to said first position in the opposite direction, said lead screw thereby being rotated through the predetermined angle and said piston being advanced into the vessel to cause a quantity of liquid material to be extruded therefrom as said drum is rotated from said first to said second position, said lead screw remaining stationary with respect to said support as said drum is rotated from said second position to said first position.

2. Apparatus for repeatedly dispensing liquid material in precise quantities including a vessel for containing liquid material, said vessel having a first aperture therein for the passage of liquid material therethrough and a second aperture therein, a piston fitted snugly within said second aperture and extending into said vessel whereby movement of the piston further into the vessel when the vessel is filled with liquid material and all gases have been expelled therefrom causes a quantity of liquid material to be displaced and dispensed from said vessel through said first aperture, a lead screw having a threaded portion and a solid cylinder portion attached to the end of said piston remote from said vessel, an annular drum encircling said lead screw and lying substantially coaxial therewith, a housing enclosing said drum, said housing being fixedly positioned with respect to said vessel, a unidirectional clutch in said drum adapted for jamming a ball between the drum and the cylinder portion of the lead screw causing the lead screw to rotate with the drum as the drum is rotated about its axis in one direction and adapted for releasing the ball and permitting the drum to rotate freely of the lead screw as the drum is rotated in the opposite direction, a band brake for contacting the cylinder portion of said lead screw to inhibit rotation of the lead screw in the opposite direction, a threaded lead screw advancing nut attached to said housing for engaging the threaded portion of the lead screw, a first stop fixed to said drum, a second stop fixed to said housing, a first position of said drum being established by said drum being fully rotated in the opposite direction so that said first and said second stops are abutting, a third stop adjustable with respect to said second stop and adapted to be secured in a fixed position with respect to said housing, a second position of said drum being established by said drum being fully rotated in the one direction so that said first and third stops are abutting, and a reversible motor for rotating said drum in each direction, said motor being connected to said drum through a slip clutch whereby after said drum has been rotated from one of said positions to the other position said motor becomes effectively disengaged from said drum, said lead screw being rotated through a predetermined angle and said piston being advanced into said vessel causing a predetermined quantity of liquid material to be extruded therefrom as said drum is rotated from said first to said second position, said lead screw remaining stationary with respect to said housing as said drum is rotated from said second position to said first position.

3. Apparatus for dispensing liquid material in a series of equal, discrete quantities, including a vessel for containing liquid material, said vessel having a first aperture therein for the passage of liquid material therethrough and a second aperture therein, a piston adapted to fit snugly within said second aperture and to extend into said vessel whereby each movement of the piston a predetermined distance into said vessel when the vessel is filled with liquid material and all gases have been expelled therefrom causes a predetermined quantity of liquid material to be displaced and extruded through said first aperture, a lead screw attached to the end of said piston remote from said vessel, a housing fixedly positioned with respect to said vessel, a lead screw advancing nut mounted in said housing for engaging the threads of the lead screw whereby rotation of the lead screw through a predetermined angle in one direction causes the lead screw and piston to advance a predetermined distance, a drive drum located within said housing and encircling a portion of said lead screw, a bearing support rotatably mounted on said housing for positioning said lead screw and said drum in said housing, a unidirectional clutch in said drive drum for binding the lead screw to the drum as the drum is rotated with respect to the housing in the one direction and for disengaging the lead screw from the drum as the drum is rotated with respect to the housing in the opposite direction, a first stop fixed to said drum, a second stop fixed to said housing, a first position of said drum being established by said drum being fully rotated in said opposite direction so that said first and second stops are abutting, a third stop fixed to said bearing support for intercepting said first stop upon rotation of said drum in the one direction, the position of said third stop being determined by the orientation of said bearing support with respect to said housing, a second position of said drum being established by said drum being fully rotated in said one direction so that said first and third stops are abutting, and driving means for rotating said drum from said first position to said second position in the one direction and for rotating said drum from said second position to said first position in the opposite direction, said lead screw being rotated through a predetermined angle and said piston being advanced into said vessel a predetermined distance causing a predetermined quantity of liquid material to be extruded therefrom as said drum is rotated from said first to said second position, said lead screw remaining stationary with respect to said support as said drum is rotated from said second position to said first position.

4. Apparatus for repeatedly dispensing liquid material in precise quantities including a vessel for containing liquid material, said vessel having a first aperture therein for the passage of liquid material therethrough and a second aperture therein, a piston adapted to fit snugly within said second aperture, one end of said piston extending into said vessel whereby each movement of the piston a predetermined distance into the vessel when the vessel is filled with liquid material and all gases have been expelled therefrom causes a predetermined quantity of liquid material to be displaced and extruded through said first aperture, a lead screw attached to the opposite end of said piston, said lead screw having a threaded portion and a solid cylinder portion, an annular drive drum encircling said lead screw and lying substantially coaxial threwith, a housing enclosing said drum, said housing being fixedly positioned with respect to said vessel, a bearing support rotatably mounted on said housing for positioning said drum and said lead screw in said housing, a unidirectional clutch in said drum adapted for jamming a ball between the drum and the cylinder portion of the lead screw causing the lead screw to rotate with the drum as the drum is rotated about its axis in one direction, and adapted for releasing the ball and permitting the drum to rotate freely of the lead screw as the drum is rotated in the opposite direction, a band brake contacting the cylinder portion of said lead screw to inhibit rotation of the lead screw in the opposite direction, a threaded lead screw advancing nut attached to said housing for engaging the threaded portion of the lead screw, a first stop fixed to said drum, a second stop fixed to said housing, a first position of said drum being established by said drum being fully rotated in said opposite direction so that said first and said second stops are abutting, a third stop fixed to said bearing support, the position of said third stop with respect to said first stop being determined by the orientation of said bearing support with respect to said housing, a second position of said drum being established by said drum being fully rotated in the one direction so that said first and third stops are abutting, and a revrsible motor for rotating said drum in each direction, said motor being connected to said drum through a slip clutch whereby after said drum has been rotated from one of said positions to the other position said motor becomes effectively disengaged from said drum, said lead screw being rotated through a predetermined angle and said piston being rotated through said predetermined angle and being advanced a predetermined distance into said vessel causing a predetermined quantity of liquid material to be extruded therefrom as said drum is rotated from said first position to said second position, said lead screw remaining stationary with respect to said housing as said drum is rotated from said second position to said first position.

5. Apparatus for advancing a lead screw in a series of precise, equal, linear movements including a lead screw having a threaded portion and a solid cylinder portion, an annular drive drum encircling said lead screw and lying substantially coaxial therewith, a housing enclosing said drum, a bearing support rotatably mounted on said housing for positioning said drum and said lead screw in said housing, a unidirectional clutch in said drum adapted for jamming a ball between the drum and the cylinder portion of the lead screw, causing the lead screw to rotate with the drum as the drum is rotated about its axis in one direction and adapted for releasing the ball and permitting the drum to rotate freely of the lead screw as the drum is rotated in the opposite direction, a band brake contacting the cylinder portion of said lead screw to inhibit rotation of the lead screw in the opposite direction, a threaded lead screw advancing nut attached to said housing for engaging the threaded portion of the lead screw, a first stop fixed to said drum, a second stop fixed to said housing, a first position of said drum being established by said drum being fully rotated in said opposite direction so that said first and said second stops are abutting, a third stop fixed to said bearing support, the position of said third stop with respect to said first stop being determined by the orientation of said bearing support with respect to said housing, a second position of said drum being established by said drum being fully rotated in the one direction so that the first and third stops are abutting, and a reversible motor for rotating said drum in each direction, said motor being connected to said drum through a slip clutch whereby after said drum has been rotated from one of said positions to the other position said motor becomes effectively disengaged from said drum, said lead screw being rotated through a predetermined angle and being advanced a predetermined distance as said drum is rotated from said first position to said second position, said lead screw remaining stationary with respect to said housing as said drum is rotated from said second position to said first position.

References Cited in the file of this patent
UNITED STATES PATENTS

| | | |
|---|---|---|
| 1,829,789 | Dammeyer | Nov. 3, 1931 |
| 2,407,208 | Sherwood | Sept. 3, 1946 |